Dec. 7, 1954          N. E. NORDIN          2,696,387
                     VEHICLE SUSPENSION
Filed June 17, 1949                        4 Sheets-Sheet 1
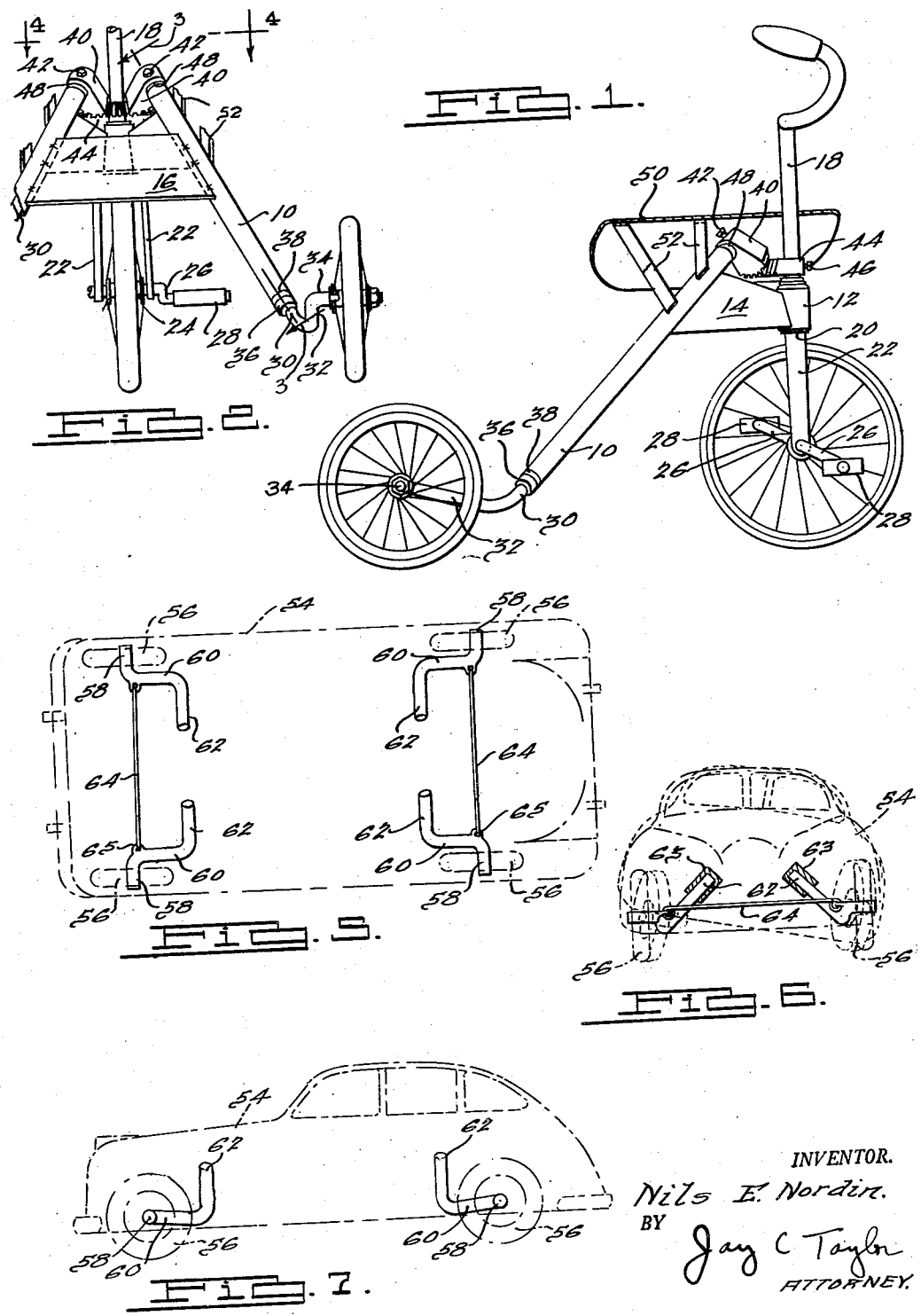
INVENTOR.
Nils E. Nordin.
BY
Jay C. Taylor
ATTORNEY.

Dec. 7, 1954
N. E. NORDIN
2,696,387
VEHICLE SUSPENSION
Filed June 17, 1949
4 Sheets-Sheet 2
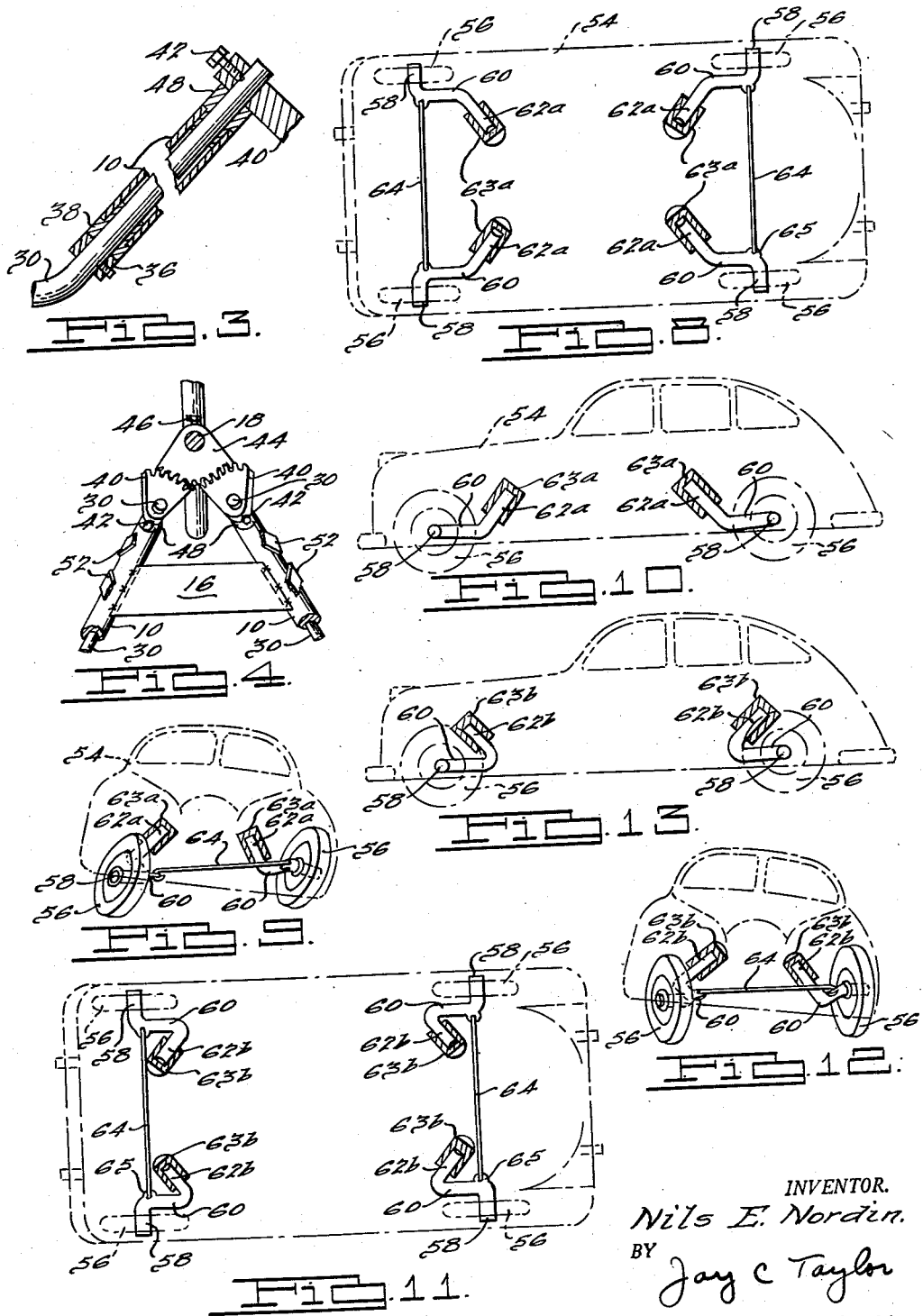
INVENTOR.
Nils E. Nordin.
BY
Jay C Taylor
ATTORNEY.

Dec. 7, 1954  N. E. NORDIN  2,696,387
VEHICLE SUSPENSION
Filed June 17, 1949  4 Sheets-Sheet 3

INVENTOR.
Nils E. Nordin.
BY
Jay C Taylor
ATTORNEY.

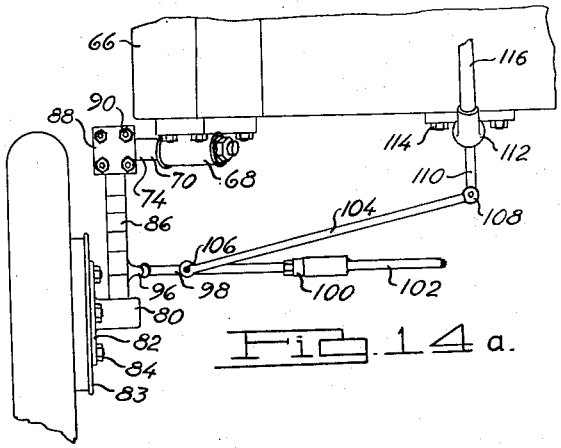
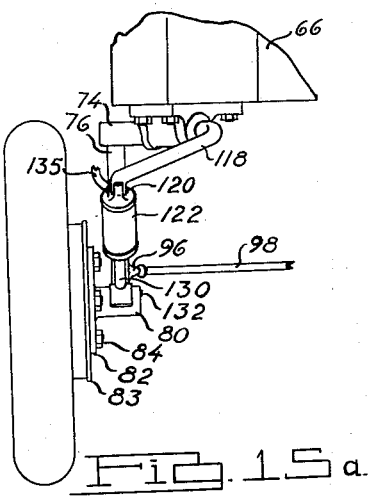
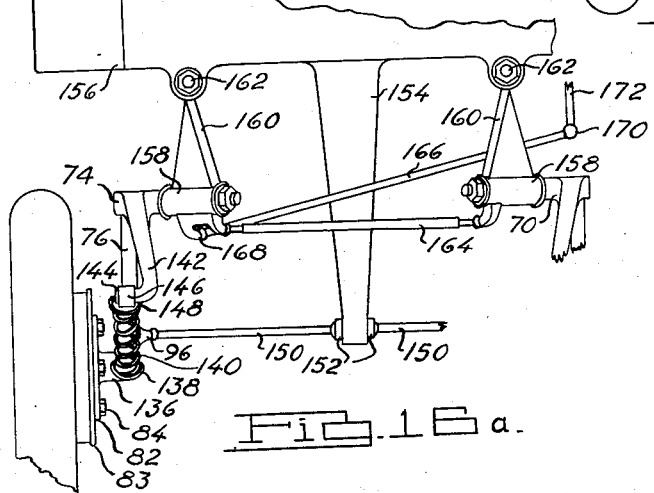
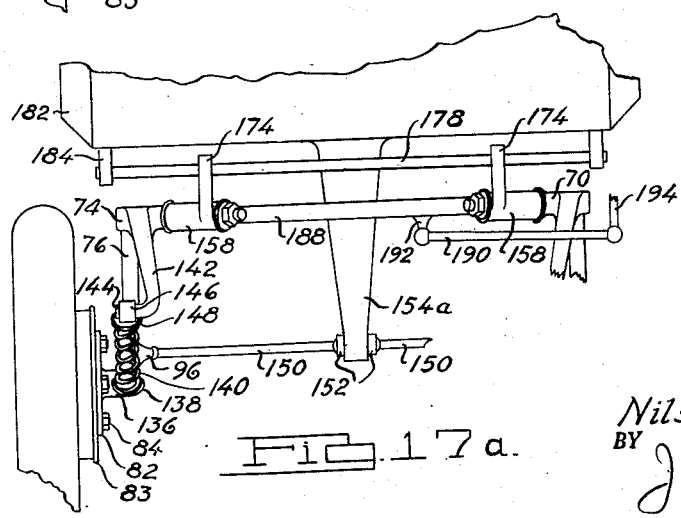

United States Patent Office 2,696,387
Patented Dec. 7, 1954

2,696,387

VEHICLE SUSPENSION

Nils E. Nordin, Chicago, Ill.

Application June 17, 1949, Serial No. 99,688

15 Claims. (Cl. 280—96.2)

This invention relates to vehicular constructions and in particular to an improved suspension and turning mechanism for a vehicle.

An object of the present invention is to provide an improved suspension or mounting of comparatively simple construction for the dirigible ground engaging members of a vehicle whereby turning and banking of the vehicle toward the inside of the turn occur in unison. Although several applications of this invention are illustrated below by way of example in connection with wheeled vehicles, the invention being particularly adapted for use with motor vehicles, trailers, wheeled toys, hand trucks, tricycles, and the like, it is to be understood that the invention is readily applicable to other vehicular types, such as sleds or the like.

Another and more specific object of the invention is to provide such a construction wherein each of the dirigible ground engaging members is mounted on the vehicle for pivoting about an axis oblique to the direction of at least one of the principal orthogonal axes of the vehicle and is disposed relative to said axis so that in turning thereabout in a steering movement, it will also swing relative to the vehicle upward on the inside of the turn and downward on the outside of the turn, thereby turning and banking the vehicle in unison and shifting the center of gravity of the vehicle in a manner tending to counterbalance the centrifugal force urging overturn of the vehicle.

Other objects are to provide an improved vehicular construction of the foregoing character whereby turning or steering of the vehicle is readily accomplished by shifting the weight or forces on the vehicle so as to tilt or bank the same; and in particular to provide an improved wheeled toy of the type intended to be pushed along a plane surface, wherein steering is readily accomplished by small children merely by tilting or banking the vehicle in the direction of the desired turn.

Other objects are to provide an improved vehicular construction of the foregoing character including means, as for example resilient means, for yieldingly maintaining the dirigible members in a predetermined steering position, which means may also serve as shock absorbing means between the dirigible ground engaging members and the vehicle body; and to provide simple means for adjusting the predetermined steering position of the dirigible members so as to compensate for varying loads placed on the vehicle, the adjusting means comprising a pressurized fluid actuated mechanism in a preferred embodiment which is readily adapted to be controlled by the vehicle operator.

In accordance with one aspect of the present invention, each dirigible ground engaging member is swung about its aforesaid oblique pivot axis in a movement having a transverse component with respect to the axis, as well as the aforementioned vertical and steering components. It is accordingly another object of the invention to provide an improved mounting for each ground engaging member whereby the aforesaid transverse movement is largely absorbed, as for example by a sliding mounting for the inclined axis or by a foldable articulated linkage connecting the ground engaging member and body, thereby minimizing or substantially avoiding relative transverse movement between the body and ground engaging member.

Still another and more specific object is to provide an improved construction in a tricycle having a dirigible central front wheel and paired lateral rear wheels, each rotatably mounted on the rear end of a forwardly extending crank arm having its other end pivotally mounted on the tricycle frame for pivoting about a forward and inwardly inclined axis and being operatively coupled with the steering mechanism for the front wheel for cooperable steering movement in unison therewith.

Inasmuch as small children are frequently awkward or so poorly coordinated physically as to be unable to avert or to protect themselves in a tumble, the present invention provides a comparatively simply constructed safety feature in a tricycle wherein banking and turning occur in unison. Furthermore, by virtue of the cooperable steering action of the front and rear wheels, the steering is accomplished with a minimum of turning of the front wheel. Accordingly in the typical tricycle construction wherein the front wheel is driven by pedals mounted on crank arms connected to the front wheel axle, a small child riding the tricycle may readily maintain his feet on the pedals even during a sharp turn.

Other objects of this invention will appear in the following description and appended claims, reference being had to the accompanying drawings forming a part of this specification wherein like reference characters designate corresponding parts in the several views.

Several applications of the present invention are illustrated by way of example in the drawings wherein:

Fig. 1 is a side elevation of a tricycle constructed in accordance with the present invention, portions of the seat structure being broken away to show details of construction.

Fig. 2 is a fragmentary rear elevation of the tricycle shown in Fig. 1.

Fig. 3 is a fragmentary enlarged section taken in the direction of the arrows substantially along the line 3—3 of Fig. 2.

Fig. 4 is a fragmentary horizontal section taken in the direction of the arrows substantially along the line 4—4 of Fig. 2, showing the interrelation between the segmental steering gears.

Fig. 5 is a plan view showing the arrangement of the dirigible members of a four-wheeled toy vehicle, the body and frame of the latter being indicated in phantom.

Fig. 6 is a front elevation of the vehicle shown in Fig. 5, portions of the vehicle frame in which the dirigible members are pivotally mounted being shown in solid cross section.

Fig. 7 is a side elevation of the vehicle shown in Fig. 5.

Fig. 8 is a plan view similar to Fig. 5, showing a modification of the oblique spindles and spindle supporting sockets.

Fig. 9 is a front elevation showing the modification of Fig. 8 in a position for steering to the left.

Fig. 10 is a side elevation of the modification shown in Fig. 8.

Fig. 11 is a plan view similar to Fig. 8, showing another modification of the oblique spindles and spindle supporting sockets.

Fig. 12 is a front elevation showing the modification of Fig. 11 in position for steering to the left.

Fig. 13 is a side elevation of the modification shown in Fig. 11.

Figure 14:
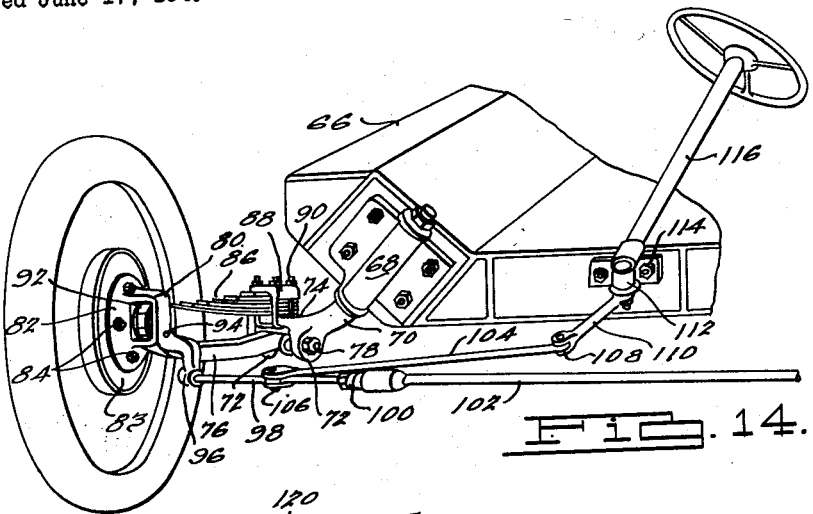
Fig. 14 is a fragmentary perspective view showing a portion of a vehicle frame and right front wheel mounted thereon in accordance with the present invention.

Figs. 14a, 15a, 16a, and 17a are fragmentary plan views of Figs. 14, 15, 16, and 17 respectively.

Before explaining the present invention in detail it is to be understood that the invention is not limited in its application to the details of construction and arrangement of parts illustrated in the accompanying drawings, since the invention is capable of other embodiments and of being practiced or carried out in various ways.

Also it is to be understood that the phraseology or terminology employed herein is for the purpose of description and not of limitation.

Referring particularly to Figs. 1 through 4, a child's tricycle constructed in accordance with the present invention is shown having a frame comprising a pair of symmetrically disposed forwardly and inwardly inclined tubular supports or struts 10 and a vertical tubular journal housing 12. The latter is rigidly connected with each strut 10 by a pair of lateral sheet metal brackets or webs 14. The struts 10 are rigidly connected by a transverse rear bracket 16. In the present instance the lateral brackets 14 are welded to rearward portions of the housing 12 and diverge rearwardly to their corresponding supports 10 to which they are also welded. The transverse bracket 16 is similarly welded at its opposite ends to one of each of the inclined supports 10 to complete a rigid triangular frame structure.

A vertical steering shaft 18 terminating upward in conventional handle bars extends coaxially through the housing 12 and is suitably mounted therein for pivotal steering movement about a vertical axis. The lower end of the shaft 18 is suitably keyed with a depending front fork member for pivoting the same in a steering action. The latter is provided with paired lateral tines 22 which support the axle 24 of the front wheel at their lower ends. Integral with the opposed ends of the axle 24 and extending oppositely from each other in vertical planes disposed laterally of the fork tines 22 are paired crank arms 26 terminating in suitable horizontally extending foot pedals 28. The structure thus far described may be conventional if desired. It is apparent that upon turning the handle bars about the axis of the vertical shaft 18, the forks 22 and front wheel are pivoted in a steering movement.

Extending coaxially within each tubular strut or support 10 is a pivotal spindle 30 having a generally rearwardly extending lever arm or extension 32 terminating in an axle stub 34 on which one of the two rear wheels is rotatably mounted. The dimensions and angular relationship between each spindle portion 30 and its associated lever 32 and axle stub 34 are determined in the present instance so that when the front and rear wheels of the tricycle are in parallel vertical planes for steering straight ahead the lever 32 will extend directly rearward at a slight incline and the axle stub 34 will extend horizontally and transversely outward from its respective side of the tricycle frame.

The proportionate weight of the tricycle frame directed along each strut 10 is supported by an annular retaining member 36 suitably fixed to the shaft 30 below the lower end of the strut 10. A suitable annular bushing 38 is interposed between the lower end of the tubular support 10 and the retainer 36 and is preferably provided with an internal sleeve bearing portion extending coaxially into the tubular support 10 to serve as a bearing between the latter and the spindle 30.

The upper end of each spindle 30 projects forward from its tubular support 10 to receive a circular gear sector 40 suitably keyed thereon to pivot coaxially therewith, as for example by means of a set screw 42. The body of each gear 40 extends radially from its supporting spindle end and angularly toward the vertical steering shaft 18, terminating peripherally in a radially toothed portion which meshes with a corresponding beveled peripherally toothed portion of a circular gear sector 44. The latter is mounted on the shaft 18 above the housing 12 and keyed to the shaft 18 for rotating coaxially therewith, as for example by a setscrew 46. An annular sleeve bushing 48, similar to the bushing 38, is preferably mounted on the upper end of each spindle 30 between the corresponding gear 40 and the adjacent upper end of the support 10 to serve as a bearing between the latter and the pivotal spindle 30. A similar annular sleeve bushing 20, comprising an annular seat for the pivot housing 12 and preferably having an annular bearing portion extending coaxially upward into the housing 12 to serve as a journal for pivotal movements of the fork member, is supported by the upper ends of the tines 22.

It is apparent from the construction shown thus far that as the front wheel is turned in a steering movement, as for example clockwise looking downward for steering to the right, the sector gear 44 keyed with the steering shaft 18 will also turn clockwise, thereby rotating the sector gears 40 and spindles 30 clockwise, looking upward along the latter. By virtue of the rearward extension of the levers 32, as the right spindle 30 pivots clockwise, looking upward along its length, the right rear wheel will swing outward, upward and forward about the oblique axis of the spindle 30. This action will of course lower the right side of the tricycle frame and will also impart a counterclockwise component of pivotal movement to the right rear wheel, looking downward about a vertical axis, steering the rear end of the tricycle to the left and thereby assisting the front wheel in turning the tricycle frame bodily to the right.

Simultaneously the rear left wheel will swing inward, downward and forward about the oblique axis of its spindle 30 thus raising the left side of the tricycle frame and pivoting the left rear wheel in a counterclockwise steering movement, looking downward, so as to cooperate with the front and right rear wheel in steering the tricycle to the right.

Accordingly the tricycle will bank to the right in the direction of the turn, shifting the center of gravity of a child on the tricycle to the right in an action tending to counterbalance the centrifugal force acting to overturn the tricycle. Obviously, upon steering to the left, the reverse action occurs, the rear wheels pivot clockwise looking downward along the aforesaid vertical axes, to cooperate with the front wheel in turning to the left. The rear wheels will also swing counterclockwise about the respective oblique pivot axes of the spindles 30, looking upward, raising the frame on the right and lowering the same on the left to bank the tricycle in the direction of the leftward turn. It is to be observed that the path of the compound pivotal movement of the left wheel in steering to the right will be a mirror image of the corresponding path of movement of the right wheel in steering to the left, and vice versa.

Any suitable seat may be provided for the tricycle in accordance with conventional practice. In the present instance a combined sheet metal saddle and guard 50 overhangs the meshed gears 40, 44 on opposite sides thereof to shield the body of the child from the mechanism. The saddle 50 is suitably supported from the frame as for example by a number of struts 52 disposed between and welded at their opposite ends to the saddle 50 and tubular supports 10.

A more complete understanding of the scope and utility of the present invention may be had in consideration of Figs. 5 through 13 wherein a toy vehicle of the type adapted to be pushed along the floor by a child is shown which is readily steered merely by tilting or banking the body of the vehicle in the direction of the desired turn. From the foregoing consideration of the tricycle, it is apparent that the steering or turning and banking movements must occur in unison. Not only will a steering movement bank the vehicle, but a force tending to bank the vehicle will steer the same. Accordingly the present invention has many useful and important applications, some of which are noted hereinafter.

In Figs. 5 through 7, the toy vehicle body 54 having four dirigible wheels 56 is indicated in phantom to facilitate a clear understanding of the operation and disposition of the dirigible members on which the wheels 56 are mounted. In the present instance, each dirigible member simply comprises a bent wire having an axle stub 58 on which one of the wheels is rotatably mounted, a lever arm portion 60 extending perpendicularly from the inner end of the axle 58, and a spindle portion 62 extending perpendicularly from the inner end of the lever arm 60. When the body 54, which may represent any desired structure, animal or the like, is in the untilted position for steering straight ahead, each axle stub 58 extends horizontally and transversely inward to the outer end of the lever or crank arm portion 60. The latter extends generally parallel to the longitudinal axis of the body in the direction toward the other wheel on the corresponding side of the body, terminating in the spindle or pivot portion 62, which is suitably mounted on the body 54, as for example within a socket 63 comprising an integral portion of the body structure, for pivoting about a fixed oblique axis inclined inwardly in a transverse vertical plane. The outer end of each lever arm 60, i. e. the forward and rearward end respectively of each forward and rearward arm 60, is suitably joined by a traverse link 64 to the corresponding outer end of the laterally opposed arm 60 to assure pivotal movement of the paired front wheels 56 about their respective spindles 62 in unison, as discussed below, and to assure that the corresponding movements of the paired rear wheels 56 will also occur in unison. Each link 64 comprises a comparatively rigid wire having looped ends engaged with the respective arms 60 by passing through holes 65 formed in the latter, Figs. 5 and 6.

It is to be noted that the mounting of the rear wheels 56 of the vehicle 54 is similar to the mounting of the rear wheels of the above described tricycle, with the primary exception that the inwardly inclined pivot axes of the rear spindle portions 62 lie in a transverse vertical plane rather than in vertical planes converging forwardly and inwardly as in Figs. 1 and 2.

It is believed that the operation of the vehicle shown in Figs. 5, 6 and 7 is clear from the structure shown. As pressure is applied to tilt the vehicle 54 to the left, i. e. lowering the left side and raising the right as indicated in Fig. 6, the wheels on the left side of the vehicle will swing upward about the fixed pivot axes of their respective spindle portions 62, permitting lowering of the left side of the body 54. The wheels on the right side of the vehicle will simultaneously swing downward with respect to the vehicle body 54 about the pivot axes of their respective spindle portions 62, permitting the right side of the body to rise. Thus the vehicle body 54 will be banked to the left.

In the same action, the two front wheels will swing in a compound pivotal movement about the fixed axes of their spindles 62, steering the wheels to the left and at the same time banking the wheels in the direction of the turn. Similarly the rear wheels will swing in a compound pivotal movement about the fixed pivot axes of their respective spindle portions 62 so as to steer the rear end of the vehicle to the right, cooperating with the front wheels in turning the vehicle to the left and at the same time banking the rear wheels in the direction of the turn.

The geometry of the construction is elementary. The pivot axis for at least one of the spindles 62 may be fixed at any desired angle oblique to the direction of at least one of the mutually orthogonal principal axes of the vehicle, comprising in the present instance the vertical axis, the horizontal longitudinal axis, and the horizontal transverse axis. Of course in the broader concept of these mutually orthogonal principal axes with respect to any wheel, the longitudinal axis is parallel to a given direction of travel of the wheel; the transverse axis is perpendicular to the longitudinal axis and parallel to the surface on which the wheel travels; and the third axis is perpendicular to both the longitudinal and transverse axis. Reference herein and in the following claims to the principal orthogonal axes will be understood to be in accordance with the foregoing broader concept, regardless whether the vehicle body or frame is orientated symmetrically with respect to these axes.

The center of the wheel 56 may be located at any reasonable point in space not on the oblique axis. Accordingly the point of ground contact of each wheel below its center will be on one side or the other of the vertical plane containing the associated oblique pivot axis. It is only necessary to mount the spindle 62 and associated axle stub 58 on the proper side of the vehicle 54, so that as the wheel 56 swings in a steering movement, it will move relative to the vehicle upward on the inside of the turn and downward on the outside of the turn. Thus as is apparent from the wheel movements defined, when looking along any oblique pivot axis in the direction such that the associated wheel turns to the left with respect to the vehicle when said wheel swings bodily clockwise about that pivot axis, i. e. when looking in the direction of inclination of any of the spindles 62, the associated wheel spaced to the left of said vertical plane containing that pivot axis will be either a left front or a right rear wheel, and the associated wheel spaced to the right of said vertical plane containing that pivot axis will be either a right front or a left rear wheel, as illustrated in the drawings. The magnitude of these movements will depend upon the location of the axle stub 58 with respect to the oblique axis of the spindle 62, which in turn will depend upon the length of the associated connecting arm 60 and its angular relation with respect to the axes of the vehicle 54. In the above regard it is to be noted that the simultaneous steering and banking action will be accomplished even if the diagonally opposed wheel mountings are interchanged. It is also to be noted that all but the diagonally opposed members 60, 62 are mirror images of each other in the present instance when in the neutral steering position, so that uniformity of tilting or banking and steering movements for both the front and rear of the vehicle is achieved. The laterally opposed arms 60 may converge or diverge with respect to each other in the neutral steering position, depending upon the angle of the oblique spindle 62.

Two alternative arrangements of the mounting 60, 62 are illustrated by way of example. In Figs. 8, 9, and 10, the spindles 62 and supporting sockets 63 of Figs. 5, 6 and 7 are replaced by spindles 62a and sockets 63a. The rear spindles 62a are mounted to pivot about axes inclined forward and inward with respect to the body 54 in substantially the same manner as the spindles 30. Correspondingly the front spindles 62a are inclined rearward and inward in order to preserve uniformity of steering and banking movements for the front and rear end of the vehicle.

In Figs. 11, 12 and 13, the spindles 62 and sockets 63 of Figs. 5, 6, and 7, are replaced by spindles 62b and sockets 63b. The rear spindles 62b are angularly disposed with respect to their corresponding lever arms 60 for pivoting about axes inclined rearward and inward. In this instance the front spindles 62b are mounted to pivot about axes inclined inward and forward. In all other respects, the construction and operation of the modifications illustrated in Figs. 8 through 13 are the same as above described in connection with Figs. 5 through 7.

As may be observed particularly in Fig. 6, the more the angle of the pivot axis 62 inclines from the horizontal, i. e. the greater the component of pivot action around a vertical axis, the more the wheels 56 will turn in a steering action for a given pivotal movement of the spindle 62 about the latter's axis. As the vehicle turns one way or the other, as for example to the left as indicated in Fig. 6, the pivot axes of the spindles 62 on the low side of the body will become more vertical, whereas the pivot axes of the spindles 62 on the high side of the vehicle will become more horizontal. Accordingly the wheels on the inside of the turn will be turned in a steering action more sharply to the left than the wheels on the outside of the turn. This is as desired since the inside wheel must negotiate a shorter radius of curvature.

It is also to be observed that as the component of the angle of each of the pivot axes of the spindles 62 measured from the transverse vertical plane is increased clockwise for the front wheels and counterclockwise for the rear wheels, toward the alternative positions 62a, banking or tilting of the wheels in the direction of a turn will increase. On the other hand, as the angular disposition of the pivot axes of the spindles 62 approach the positions 62b, banking of the wheels 56 in the direction of a turn will gradually decrease until finally at the positions 62b the wheels 56 will bank away from the turn.

Inasmuch as the body 54 will continue to bank toward the turn, it is apparent that the positions 62b may be determined so that the resultant positions of the wheels 56 with respect to the ground will remain in essentially vertical planes throughout the banking turn. In other words, a moderate banking of the wheels in the direction of the turn is achieved by the position of the spindles 62 indicated in solid lines in Figs. 5 through 7. Upon increasing the angle between each spindle portion 62 and its lever arm portion 60 towards the corresponding position 62a, banking of each wheel 56 in a turn is increased. Upon decreasing the angle between each spindle 62 and its lever arm 60 toward the corresponding position indicated at 62b, banking of each wheel 62 in a turn is diminished. These factors will be considered in the design and construction of a vehicle in accordance with the particular requirements thereof.

The wheel suspensions discussed thus far have many applications other than in children's toys and are especially adapted for use with motor vehicles, trailers, either two wheeled or four, and the like. One application of particular utility is with two wheeled hand trucks. In operation of conventional two wheeled hand trucks it is necessary for the operator at the rear of the truck to pivot the same about one wheel or the other in negotiating a turn and to walk in an arc around the pivot point. This procedure is particularly inconvenient where it is desired to make a sharp turn, and may be substantially avoided by use of a wheel suspension embodying the present invention with the hand truck. Thus the operator of the hand truck need merely tilt or bank the same in the direction of the desired turn in order to steer the truck. The operator then simply follows the truck around the turn. Obviously similar steering conveniences are obtained with four wheeled hand trucks or push carts, since the operator need not take his hands from the truck and lose forward momentum in order to make a turn, as is presently required with push carts employing conventional steering apparatus requiring the use of at least one of the operator's hands in a steering movement.

Various adaptations of the present invention for use in motor vehicles are indicated in Figs. 14 through 17. In Fig. 14 the motor vehicle frame or chassis is indicated at 66. A spindle housing or journal 68, having lateral wings suitably bolted to the forward end of the frame 66, supports an oblique spindle 70 suitably mounted therein for pivoting about the aforesaid axis oblique to the direction of at least one of the mutually orthogonal principal axes of the vehicle, as discussed above. The housing 68 shown is comparable to the above described spindle mountings 10 and 63 and the spindle 70 is comparable to the above described spindle portions 30 and 62. Only the suspension for the right front wheel is shown in Fig. 14 and the subsequent drawings, it being understood that the mountings for the other wheels are substantially the same so as to avoid longitudinal tilting or twisting of the vehicle during a turn, all but the diagonally opposed mountings being preferably mirror images of each other in the neutral steering position, as discussed above. The mechanism for steering the rear wheels may be substantially the same as employed to steer the front wheels and may comprise any suitable mechanism known to the art, all of the dirigible wheels being preferably operatively connected with a conventional steering wheel as indicated in Fig. 14. Furthermore, although the wheels shown are considered herein as right front wheels, it will be apparent from the following that these wheels, particularly in Figs. 15, 16, and 17, may be considered left rear wheels just as well.

In Fig. 14, the lower end of the spindle 70 is provided with an integral yoke having depending lateral arms 72 joined by an upper transverse bracket 74. A lever arm 76, comparable to the aforementioned lever arms 32 and 60, is pivotally secured between the yoke arms 72 by means of a transverse pin 78 for pivoting about a generally horizontal transverse axis when the steering mechanism is in position for steering straight ahead. The forward end of the arm 76 is integral with a shackle housing 80 and a wheel supporting plate 82 to which a wheel support or mounting 83 is suitably secured as for example by a plurality of bolts 84. The mounting between the support 83 and the wheel may be conventional and is accordingly not disclosed in detail. It preferably includes the usual brake drum and brake band for stopping or braking the wheel in accordance with conventional practice. As indicated in Fig. 14, the support 83 and plate 82 are preferably adapted to support the wheel for rotation about a horizontal transverse axis when the steering mechanism is in the position for steering straight ahead.

A longitudinally extending leaf spring 86 is suitably secured at its butt end on the bracket 74 by means of a spring shackle 88 and U-bolts 90. The forward end of the spring 86 is suitably secured to a forward shackle 92 which in turn is pivotally mounted within the housing 80 for pivoting about the axis of a pin 94 secured within the housing 80 parallel to the axis of rotation of the wheel. By this construction, the wheel is resiliently held in a desired relationship with respect to the oblique spindle 70 and is movable vertically about the transverse pivot 78 against the tension of the spring 86 in a manner to absorb shocks or jolts from the road. Nevertheless the wheel may be swung about the pivot axis of the spindle 70 outward and upward for steering to the right or inward and downward for steering to the left, causing simultaneous banking and steering of the vehicle in the manner above described.

In the present instance, steering of the vehicle by the driver may be accomplished in any suitable or conventional manner by means of a depending bracket arm 96 integral with the shackle housing 80 and flexibly secured to the outer end of a transverse steering link 98. Any suitable articulate connection between the depending bracket 96 and the link 98 may be employed to permit the desired compound steering movement of the wheel, as for example a resilient joint or a ball and socket type joint or the like. The inner end of the link 98 is connected by an extensible adjustable connection 100 to a transverse extension 102 which is suitably connected at its other end to the left front wheel by means comparable to the connection between the link 98 and the depending arm 96.

Transverse movement of the steering links 98, 102 to effect simultaneous steering movement of the front wheels is effected by a generally horizontally movable angularly rearward extending steering link 104 pivotally connected at its forward end at 106 to the link 98 and pivotally connected at its rearward end at 108 to the forward end of a horizontally swinging arm 110. The inner end of the latter is operatively connected by means of a gear mechanism within a housing 112, suitably secured to the forward end of the chassis 66 by a plurality of bolts 114, with a conventional rearwardly inclined steering shaft 116 having a steering wheel at its upper end for rotation thereof about its longitudinal axis. The gear system within the housing 112 may comprise any suitable mechanism for swinging the arm 110 in a steering action about a vertical axis through the housing 112 in response to steering movement of the shaft 116, as for example a conventional worm drive and worm gear.

Figures 15, 16:
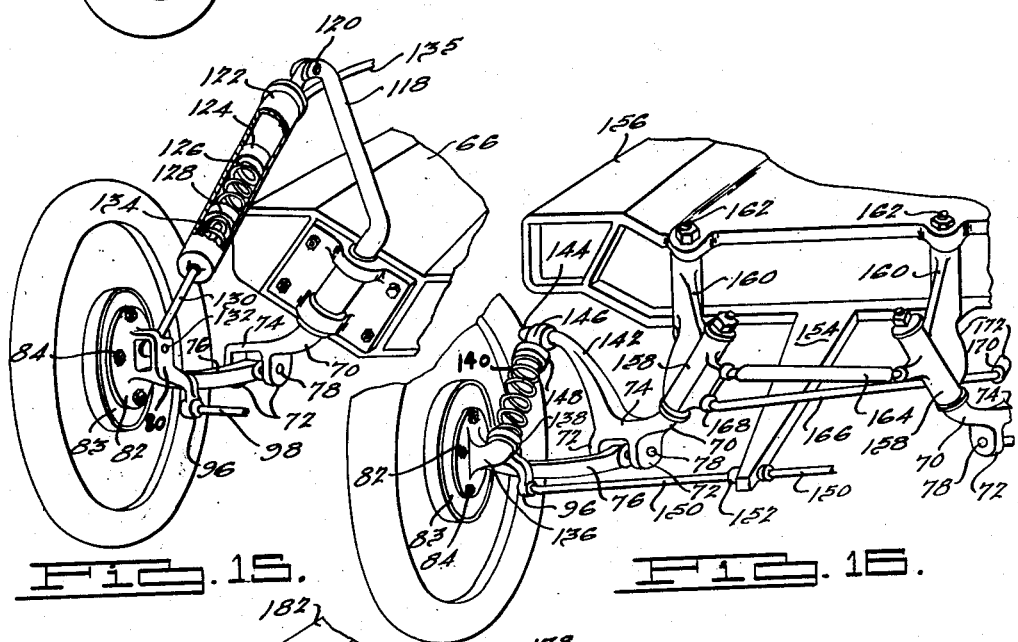
Fig. 15 is a fragmentary perspective view similar to Fig. 14, showing a modified form of spring suspension.
Fig. 16 is a fragmentary perspective view similar to Fig. 14, showing another modification of the present invention.

Various means may be employed for adjusting the tension of the suspension spring to hold the ground engaging wheel in a predetermined steering position with respect to the oblique spindle and to compensate for varying loads on the vehicle chassis tending to tilt or bank the same and correspondingly to turn the wheel. In a preferred construction the compensating spring tension is adjusted by hydraulic or pneumatic pressure, suitably controlled by the driver or passenger within the vehicle. An example of such a construction is illustrated in Fig. 15 which shows a wheel mounting substantially the same as described in connection with Fig. 14 differing primarily in that a cylinder supporting arm 118 integral with the spindle 70 projects upward and outward from the housing 68 and is pivotally connected at its upper end at 120 to the upper end of a cylindrical piston housing 122. The latter declines toward the shackle housing 80 and contains a reciprocable piston or plunger 124 which is urged downward by pressurized fluid against the upper end of a coil spring 126 contained within the lower portion of the cylinder 122. The lower end of the spring 126 seats against a plunger 128 having an attached arm 130 extending coaxially through the lower end of the cylinder 122 and pivotally secured at 132 within the shackle housing 80. The pin 132 is comparable to the pin 94 and extends parallel to the axis of rotation of the wheel. A second coil spring 134, if desired, is disposed between the lower end of the cylinder 122 and the underside of the plunger 128, clamping the latter between the opposed springs 126, 134 in a two way shock absorbing action.

Hydraulic fluid from a suitable source, not shown, under the control of the driver is forced under pressure into the cylinder 122 above the plunger 124 through a conduit 135, forcing the piston or plunger 124 downward against the spring 126 and tensioning the latter against the plunger 128 and spring 134 at any desired pressure, whereby the wheel is held yieldingly at a predetermined steering position. Thus, if the vehicle is unevenly loaded or driven along an inclined surface, the driver of the vehicle may conveniently adjust the hydraulic pressure of the fluid above the piston 124, thereby compensating for the uneven distribution of the load on the vehicle or the incline of the surface over which the vehicle is traveling.

It will be observed from the foregoing that as the ground engaging wheels turn in a steering movement, the vehicle body also moves transversely with respect to the wheels. This relative transverse movement between the body and wheels may be minimized as indicated in Fig. 16 without sacrificing the desired simultaneous banking and turning movement. In Fig. 16 the wheel mounting is similar to that described in connection with Figs. 14 and 15, differing primarily in that a bracket 136 integral with the plate or support 82 for the wheel mounting 83 supplants the shackle housing 80 and is provided with a spring retaining seat 138. The lower end of a coil shock absorbing spring 140 is suitably secured to and seated on the seat 138. Extending upward from the yoke bracket 74 of the spindle 70 is a spring supporting arm 142 terminating in a pivot 144 on which is mounted the butt end 146 of an upper spring retaining seat 148. The latter is secured to the upper end of the spring 140. Thus shocks or jolts to the wheel are absorbed by the spring 140 between the wheel and structure of the oblique spindle 70.

The depending arm 96 is in this instance integral with the bracket 136 and is articulately connected to the outer end of a transverse tie link 150, also articulately connected at its inner end at 152 to the forward end of a rigid tongue 154. The latter is integral with the vehicle frame or chassis 156 and projects forward along the midline thereof. The articulate connections made by the link 150 with the tongue 154 and depending arm 96 may also comprise any suitable construction.

The spindle 70 in Fig. 16 is pivotally within an oblique pivot housing 158 disposed at the desired oblique angle as discussed above. The spindle housing 158 in turn is mounted on the forward end of a forward horizontally projecting swinging bracket 160 which is pivotally connected at its rearward end at 162 to the frame 156 for pivoting about an axis parallel to the vertical axis of the vehicle.

The wheel mountings on opposite sides of the vehicle in this case as before are substantially the same so that a detailed showing of both sides is not necessary. There will of course be an oblique spindle housing 158 on each side of the midline of the vehicle for each of the laterally opposed front wheels. In order to assure steering movement thereof in unison, a tie link 164 is flexibly connected at its opposite ends to the laterally opposed oblique spindle housings 158.

Any desired means may be employed to connect the coupled spindle housings 158 to a suitable actuating mechanism, which in the present instance comprises a link 166 comparable to the link 104 and flexibly connected at 168 to the right spindle housing 158. The rearward end of the link 166 is flexibly connected at 170 to a swinging arm 172 comparable to the arm 110 and suitably operated by a steering wheel in a conventional manner as described above in connection with the operation of the arm 110.

By this construction, as the wheels swing about the axes of the corresponding spindles 70, lateral movement of the wheels with respect to the tongue 154 and correspondingly with respect to the frame 156 is minimized, although the vertical components of swinging movements of the wheels for banking the frame 156 and the components of steering movements of the wheels around vertical axes is permitted by the flexible or articulate couplings between the ends of the paired tie links 150 and the corresponding depending arms 96 and the forward end of the tongue 154. The above described relative lateral movements between the body 156 and ground engaging wheels are substantially absorbed in the construction of Fig. 16 by swinging movements of the brackets 160 about their respective pivots 162, which shift the spindle housings 158 laterally in accordance with the requirements of steering movements.

For example, when the steering link 166 is moved to swing the paired spindle housings 158 to the right in Fig. 16, i. e. to the left side of the vehicle, the right wheel, being prevented from appreciable lateral movement with respect to the body 156, will swing upward and outward in a movement about the axis of the corresponding spindle 70 for steering to the right. Similarly the left wheel will swing downward with respect to the chassis 156 and turn about a vertical axis for steering to the right. Thus the vehicle will be steered to the right and simultaneously banked in the direction of the turn.

Each spindle housing 158 serves in the nature of a toggle knee between the brackets 74 and 160. Upon folding or unfolding of the toggle 74, 160 in a steering action, the associated wheel is swung toward or away from the vehicle frame 156 respectively in an arc generally about the corresponding articulation 152 for the associated tie link 150, the latter serving as a radius arm swinging rearward or forward as the movement requires.

Thus in a steering action, in turning to the right for example, the right wheel will swing rearward toward the frame 156 substantially in an arc having a radius equal to the right link 150 swinging about its connection 152. Similarly the left wheel will swing in an arc of radius substantially equal to the left link 150 swinging about its connection 152.

Figure 17:
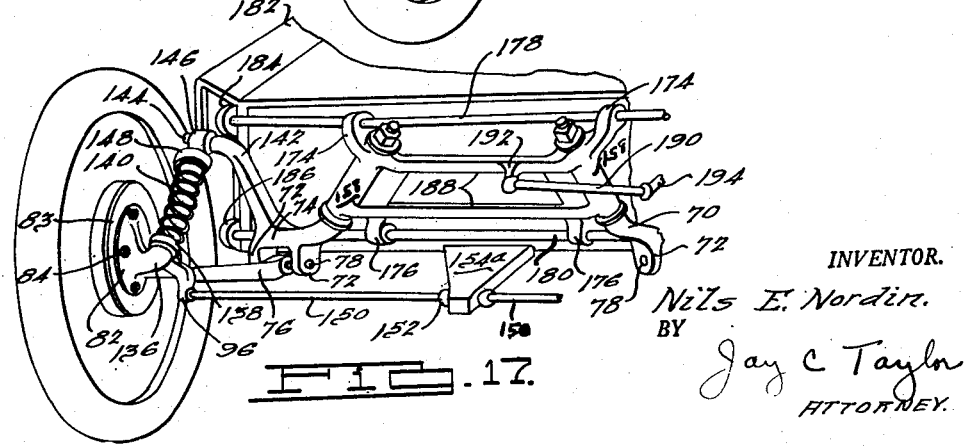
Fig. 17 is a fragmentary perspective view similar to Fig. 14, showing still another modification of the present invention.

In Fig. 17 another suspension is shown which similarly permits turning and banking of the vehicle while holding the wheels and the frame substantially against relative transverse movement. In this construction the wheel and spindle mounting is similar to that described in connection with Fig. 16. However in place of the swinging bracket 160, each spindle housing 158 is provided with integral upper and lower slide bushings 174 and 176 respectively slidably mounted on upper and lower transverse slideways or rods 178 and 180 respectively, which in turn are suitably mounted at their opposite ends to the forward end of the vehicle chassis 182 by means of paired laterally spaced upper and lower forward projecting bosses 184 and 186 respectively.

The spindle housings 158 are integrally coupled by a rigid transverse bracket structure 188. A steering link 190 comparable to the link 166 is flexibly connected at its forward end to a boss 192 integral with the bracket structure 188, and is flexibly connected at its rearward end to the outer end of a swinging operating arm 194 comparable to the arm 172. The inner end of the arm 194 is operatively coupled with a suitable steering mechanism so as to for swinging the link 190 in a transverse motion, so as to slide the coupled spindle housings 158 along the rods 178, 180. As may be observed in Fig. 17, the spindle housings 158 are mounted closely to the forward end of the body or chassis 182, so that the tongue 154a comparable to the tongue 154 is appreciably shorter than the latter.

It is apparent that upon moving the steering link 190 so as to slide the bracket structure 188 and pivot housings 158 to the right in Fig. 17, i. e. to the left side of the vehicle, the right wheel will be turned in a movement steering to the right and will be raised relative to the chassis 182. Correspondingly the left wheel will also be turned to the right and lowered, thereby banking the vehicle in the direction of the turn. The reverse action will of course occur in Figs. 16 and 17 upon moving the pivot housings 158 toward the right side of the vehicle, i. e. to the left in Fig. 17.

In addition to the above mentioned advantages of banking and turning a vehicle in unison, the present invention provides other advantages over conventional constructions, some of which are indicated below. Obviously the center of gravity of the vehicle and passengers will be shifted to counterbalance the centrifugal force induced by the turn, giving a more comfortable ride to the passengers and at the same time permitting economies in construction and materials by minimizing the stress to which the conventional vehicle is ordinarily subjected in rounding a curve. Likewise, as may be observed particularly in Figs. 14, 15 and 16, the conventional chassis structure may be appreciably shortened with economy without decreasing the wheel base, since by virtue of the present invention, it is unnecessary to extend the heavy longitudinal chassis sills over the front and rear axles as in conventional construction.

As may be observed further in Figs. 14 through 17, in a braking action when the vehicle is moving forward, the lever arms 76 connected to the mounting 83 for the front wheel braking means will be frictionally bound to the front wheels and urged upward about the axes of rotation of the wheels, raising the front end of the vehicle body. Similarly the lever arms 76 connected to the braking means for the rear wheels will be frictionally bound to the latter and forced downward, lowering the rear end of the vehicle body. These movements are of course reversed when the vehicle is stopped during rearward travel.

I claim:
1. In a vehicle, a frame, a pair of forward ground engaging wheels at opposite sides of said vehicle respectively, a pair of dirigible means on said frame and associated with said wheels respectively for steering and simultaneously banking said vehicle in the direction of the turn, each dirigible means comprising a pivotal means having a pivot axis oblique to at least one of the principal orthogonal axes of said vehicle and also comprising a swinging means connected to said pivotal means to swing therewith about the latter's pivot axis, each wheel being journaled on one of each of the swinging means to swing bodily therewith, the vertical plane containing each pivot axis having left and right sides with respect to a view along that pivot axis in the direction such that when the associated wheel swings clockwise about that pivot axis the said associated wheel turns to the left with respect to said vehicle, the wheel at the left side of said vehicle having its point of ground contact on the above defined left side of said vertical plane which contains said pivot axis about which the latter wheel swings, the wheel at the right side of said frame having its point of ground contact on the above defined right side of said vertical plane which contains said pivot axis about which the last named wheel swings, and connecting means connecting said pair of dirigible means for movement in unison.

2. The combination in a vehicle as set forth in claim 1 and being further characterized in that each swinging means is connected with its respective pivotal means at a pivotal connection having a generally transverse pivot axis, and resilient means is connected to each pivotal means and associated swinging means under tension to thereby hold the latter two means yieldingly in predetermined spatial relationship with respect to each other.

3. The combination in a vehicle as set forth in claim 2 wherein the pivot axis of each pivotal means is inclined with respect to the horizontal, the path of pivotal movement of each pivotal means with respect to its pivot axis is circular, each swinging means extends forward from its pivotal connection with its associated pivotal means, each wheel is journaled on its associated swinging means adjacent the forward end of the latter, and said connecting means comprises a transverse tie-rod connecting the two swinging means.

4. The combination in a vehicle as set forth in claim 2 wherein each dirigible means also comprises a member connected with the frame and having a transversely shiftable portion connected with the associated pivotal means, and movement limiting means are provided on said frame and operatively associated with said dirigible means to limit transverse swinging of said swinging means.

5. The combination in a vehicle as set forth in claim 4 wherein said connecting means comprises a spacer disposed between and connecting the shiftable portions of the members of said dirigible means.

6. The combination in a vehicle as set forth in claim 5 wherein each member has a rearward end pivoted on said frame and a forward transversely swinging end comprising said transversely shiftable portion, each swinging means extends forward from its generally transverse pivotal connection with its associated pivotal means, and each wheel is journaled on the forward end of its associated swinging means.

7. The combination in a vehicle as set forth in claim 1 wherein each swinging means is pivotally connected with its respective pivotal means at a pivotal connection having a generally transverse pivot axis, each swinging means has a portion spaced from a portion of the associated pivotal means, said portions being spaced arcuately about said generally transverse pivot axis, and an adjustable extensible means is disposed between said portions to adjust the spacing therebetween.

8. The combination in a vehicle as set forth in claim 1 wherein the pivot axis of each pivotal means is inclined with respect to the horizontal and fixed with respect to said frame, the path of pivotal movement of each pivotal means with respect to its pivot axis is circular and each swinging means is connected with its respective pivotal means at a pivotal connection having a generally transverse pivot axis, the combination comprising in addition resilient means connected with each pivotal means and associated swinging means to thereby hold the latter two means yieldingly in predetermined spaced relationship with respect to each other, and means for adjusting the tension in said resilient means.

9. In a vehicle, a frame, a pair of forward ground engaging wheels at opposite sides of said frame respectively, means for turning said wheels to steer and simultaneously to bank said vehicle in the direction of the turn comprising a pair of swinging supports pivoted on said frame and having said wheels journaled thereon respectively to swing the same bodily, the pivot axes of swinging of said supports being oblique to at least one of the principal orthogonal axes of said vehicle, the vertical plane containing each pivot axis having left and right sides with respect to a view along that pivot axis in the direction such that when the associated wheel swings clockwise about that pivot axis the said associated wheel turns to the left with respect to said vehicle, the wheel at the left side of said vehicle having its point of ground contact on the above defined left side of said vertical plane which contains said pivot axis about which the latter wheel swings, the wheel at the right side of said vehicle having its point of ground contact on the above defined right side of said vertical plane which contains said pivot axis about which the last named wheel swings, and connecting means connecting said supports for swinging in unison.

10. The combination in a vehicle as set forth in claim 9 and comprising in addition a pair of rearward ground engaging wheels at opposite sides of said frame respectively, means for turning said rearward wheels to steer and simultaneously to bank said vehicle in the direction of the turn comprising a second pair of swinging supports pivoted on said frame and having said rearward wheels journaled thereon respectively to swing the same bodily, the pivot axis of swinging of said second supports being also oblique to at least one of the principal orthogonal axes of said vehicle, the vertical plane containing each of the latter pivot axis also having left and right sides with respect to a view along that pivot axis in the direction such that when the associated wheel swings clockwise about that pivot axis the said associated wheel turns to the left with respect to said vehicle, the point of ground contact of the rearward wheel at the left side of said vehicle being on the above defined right side of said vertical plane, containing said pivot axis about which the latter rearward wheel swings, the point of ground contact of the rearward wheel at the right side of said vehicle being on the above defined left side of said vertical plane containing said pivot axis about which the last named rearward wheel swings, and second connecting means connecting said second supports for swinging in unison.

11. The combination in a vehicle as set forth in claim 10 wherein the path of swinging movement of each support with respect to its pivot axis is circular, and each of said connecting means comprises a transverse tie-rod connected to the respective supports adjacent the wheels thereon respectively.

12. In a vehicle, a frame, a pair of forward ground engaging wheels at opposite sides of said frame respectively, means for turning said wheels to steer and simultaneously to bank said vehicle in the direction of the turn comprising a pair of swinging supports pivoted on said frame and having said wheels journaled thereon respectively to swing the same bodily, the pivot axes of swinging of said supports being inclined with respect to the horizontal, the vertical plane along each pivot axis having left and right sides with respect to a view along that axis in its direction of inclination, the wheel at the left side of said vehicle having its point of ground contact on the above defined left side of said vertical plane containing said pivot axis about which the latter wheel swings, and the wheel at the right side of said vehicle having its point of ground contact on the above defined right side of said vertical plane containing said pivot axis about which the last named wheel swings, and connecting means connecting said pair of supports for swinging in unison.

13. The combination in a vehicle as set forth in claim 12 wherein the pivot axis of each support is fixed with respect to said frame, the path of swinging movement of each support with respect to its pivot axis is circular, and said connecting means comprises a transverse tie-rod connected to said supports adjacent the wheels thereon respectively.

14. The combination in a vehicle as set forth in claim 12 and comprising in addition a pair of rearward ground engaging wheels at opposite sides of said frame respectively, means for turning said rearward wheels to steer and simultaneously to bank said vehicle in the direction of the turn comprising a second pair of swinging supports pivoted on said frame and having said rearward wheels journaled thereon respectively to swing the same bodily, the pivot axes of swinging of said second supports being also inclined with respect to the horizontal, the vertical plane containing each of the latter pivot axes also having left and right sides with respect to a view along that pivot axis in the direction such that when the associated wheel swings clockwise about that pivot axis the said associated wheel turns to the left with respect to said vehicle, the point of ground contact of the rearward wheel at the left side of said vehicle being on the above defined right side of said vertical plane containing said pivot axis about which the latter rearward wheel swings, the point of ground contact of the rearward wheel at the right side of said vehicle being on the above defined left side of said vertical plane containing said pivot axis about which the last named rearward wheel swings, and second connecting means connecting said second pair of supports for swinging in unison.

15. The combination in a vehicle as set forth in claim 14 wherein the pivot axis of each support is fixed with respect to said frame, the path of swinging movement of each support with respect to its pivot axis is circular, and each connecting means comprises a transverse tie-rod connected to the respective supports adjacent the wheels thereon respectively.

References Cited in the file of this patent

UNITED STATES PATENTS

| Number | Name | Date |
| --- | --- | --- |
| 385,847 | Copeland | July 10, 1888 |
| 723,975 | Ball Jr. | Mar. 31, 1903 |
| 776,078 | Murphy | Nov. 29, 1904 |
| 1,256,963 | Weston Jr. | Feb. 19, 1918 |
| 2,115,256 | Eckenrode | Apr. 26, 1938 |
| 2,150,199 | Weston | Mar. 14, 1939 |
| 2,153,233 | Best | Apr. 4, 1939 |
| 2,182,560 | Higbee | Dec. 5, 1939 |
| 2,341,726 | Kolbe | Feb. 15, 1944 |
| 2,433,148 | Orelind et al. | Dec. 23, 1947 |
| 2,582,455 | Potter | Jan. 15, 1952 |